(12) United States Patent
Miyamoto

(10) Patent No.: US 7,742,246 B2
(45) Date of Patent: Jun. 22, 2010

(54) LENS BARREL AND CAMERA WITH LENS BARREL

(75) Inventor: Hidenori Miyamoto, Urayasu (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 11/989,479

(22) PCT Filed: Jul. 26, 2006

(86) PCT No.: PCT/JP2006/314788

§ 371 (c)(1),
(2), (4) Date: Dec. 29, 2008

(87) PCT Pub. No.: WO2007/013523

PCT Pub. Date: Feb. 1, 2007

(65) Prior Publication Data

US 2009/0195890 A1    Aug. 6, 2009

(30) Foreign Application Priority Data

Jul. 28, 2005    (JP) .............................. 2005-218821

(51) Int. Cl.
G02B 7/02    (2006.01)
(52) U.S. Cl. ....................... 359/819; 359/811
(58) Field of Classification Search .................. 359/819
See application file for complete search history.

(56) References Cited

U.S. PATENT DOCUMENTS

| 6,333,823 B1 | 12/2001 | Ozaki et al. |
| 2003/0160902 A1* | 8/2003 | Mihara et al. ............... 348/676 |
| 2006/0098306 A1* | 5/2006 | Yoshitsugu et al. ......... 359/819 |

FOREIGN PATENT DOCUMENTS

| JP | A-10-20191 | 1/1998 |
| JP | A-11-258678 | 9/1999 |
| JP | A-2002-169088 | 6/2002 |
| JP | A-2002-300438 | 10/2002 |
| JP | A-2003-169236 | 6/2003 |

* cited by examiner

*Primary Examiner*—Jordan M. Schwartz
*Assistant Examiner*—James C Jones
(74) *Attorney, Agent, or Firm*—Oliff & Berridge, PLC.

(57) ABSTRACT

A lens barrel includes: a first optical element group that has an optical element disposed on a first optical axis; a second optical element group that has an optical element disposed on a second optical axis extending along a direction different from a direction along which the first optical axis extends; and a bending portion disposed between the first optical element group and the second optical element group, that bends image light having passed through the first optical element. At least part of the first optical element group can be housed inside a first space formed as the bending portion moves further away from the first optical axis.

5 Claims, 14 Drawing Sheets

LENS BARREL AND CAMERA WITH LENS BARREL

TECHNICAL FIELD

The present invention relates to a lens barrel and a camera equipped with the lens barrel.

BACKGROUND ART

The lens barrel in a camera in the related art may include a bending optical system with a bending portion for changing the direction in which the optical axis extends, installed over an intermediate area in the photographic optical system. The bending optical system is used to achieve a lower profile for the camera. For instance, there is a photographic lens barrel known in the related art that includes a reflecting mirror functioning as a bending portion and installed over a middle area in the photographic optical system and lens groups disposed on the objective side and the image side relative to the bending portion to be engaged in a zooming operation or the like (see patent reference literature 1).

Patent reference literature 1 Japanese Laid Open Patent Publication No. H11-258678

DISCLOSURE OF THE INVENTION

Problems to be Solved by the Invention

Depending upon the structures assumed in the lens groups disposed further toward the objective side relative to the bending portion of a bending optical system installed at a lens barrel, the lens groups may project out further toward the subject beyond the camera casing. In such a case, the use of the bending optical system does not achieve the desired advantage, i.e., the camera cannot be stored as a compact unit.

Means for Solving the Problems

A lens barrel according to a first aspect of the present invention includes: a first optical element group that has an optical element disposed on a first optical axis; a second optical element group that has an optical element disposed on a second optical axis extending along a direction different from a direction along which the first optical axis extends; and a bending portion disposed between the first optical element group and the second optical element group, that bends image light having passed through the first optical element, wherein: at least part of the first optical element group can be housed inside a first space formed as the bending portion moves further away from the first optical axis.

It is preferable that at least part of the bending portion can be housed inside a second space formed as the second optical element group moves further toward an image side relative to a photographing position at which photographing operation executed by using the lens barrel is allowed. It is preferable that at least part of the first optical element group and at least part of the bending portion are respectively housed inside the first space and the second space when the lens barrel shifts from the photographing position to a storage position at which the photographing operation is not allowed. When the lens barrel shifts from the photographing position to the storage position, the bending portion may move toward the image side along the second optical axis and the first optical element group may move toward a subject side along the first optical axis. It is preferable to further include: a first cam cylinder that houses the first optical element group and moves the first optical element group along the first optical axis; a second cam cylinder that moves the bending portion and the second optical element group along the second optical axis; and a fixed cylinder with the first cam cylinder disposed therein, that is connected with the second cam cylinder, and that the first cam cylinder is housed inside the fixed cylinder at the storage position. The first cam cylinder may include a cam groove at which a cam follower pin disposed at the first optical element group is inserted; and the cam groove may include an area, used over a range between a wide-angle end and a telephoto end assumed at the photographing position and an area, used over a range between the wide-angle end of the photographing position and the storage position, which incline along directions opposite from each other.

A camera according to a second aspect of the present invention includes a lens barrel according to the first aspect.

In a lens barrel storage method according to a third aspect of the present invention, a first optical element group is moved toward a subject side along a first optical axis; a second optical element group is moved toward an image side along a second optical axis extending along a direction different from a direction along which the first optical axis extends; a bending portion disposed between the first optical element group and the second optical element group to bend image light having passed through the first optical element, is moved toward the image side along the second optical axis; and at least part of the first optical element group is housed in a space formed as the bending portion moves toward the image side along the second optical axis.

ADVANTAGEOUS EFFECT OF THE INVENTION

According to the present invention, a lens barrel that includes a bending portion can be provided as a compact unit.

BEST MODE FOR CARRYING OUT THE INVENTION

A lens barrel achieved in an embodiment of the present invention includes a bending optical system and houses lens groups disposed further on the objective side relative to a prism functioning as a bending portion, in a space formed by causing the prism to retreat along the optical axis toward the exit side thereof. This positional arrangement allows the camera mounted with the lens barrel to assume a compact form as it is stored.

Figure 1:
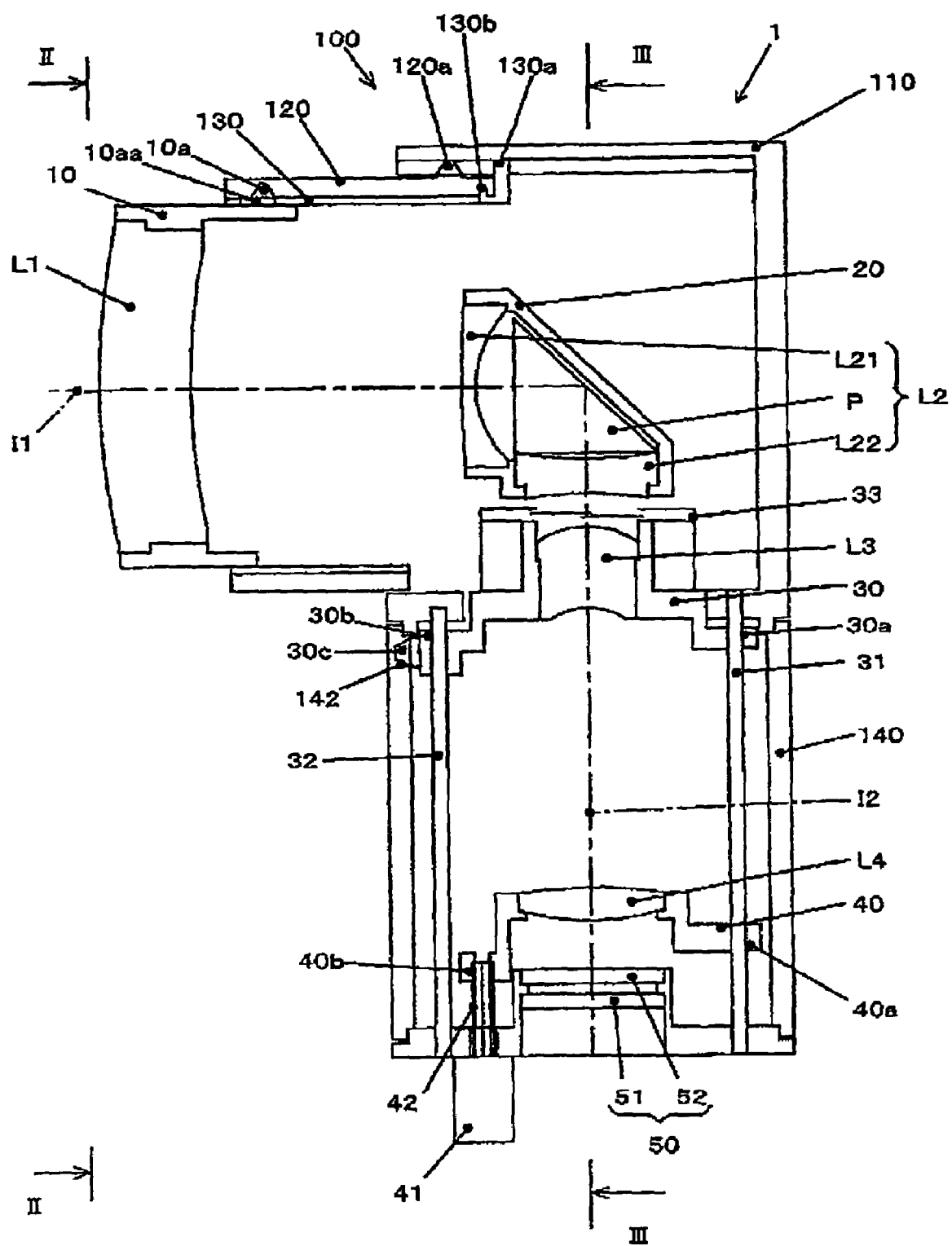
FIG. 1 is a sectional view of a lens barrel achieved in an embodiment of the present invention in a photographing state, taken at the telephoto end.
Figure 2:
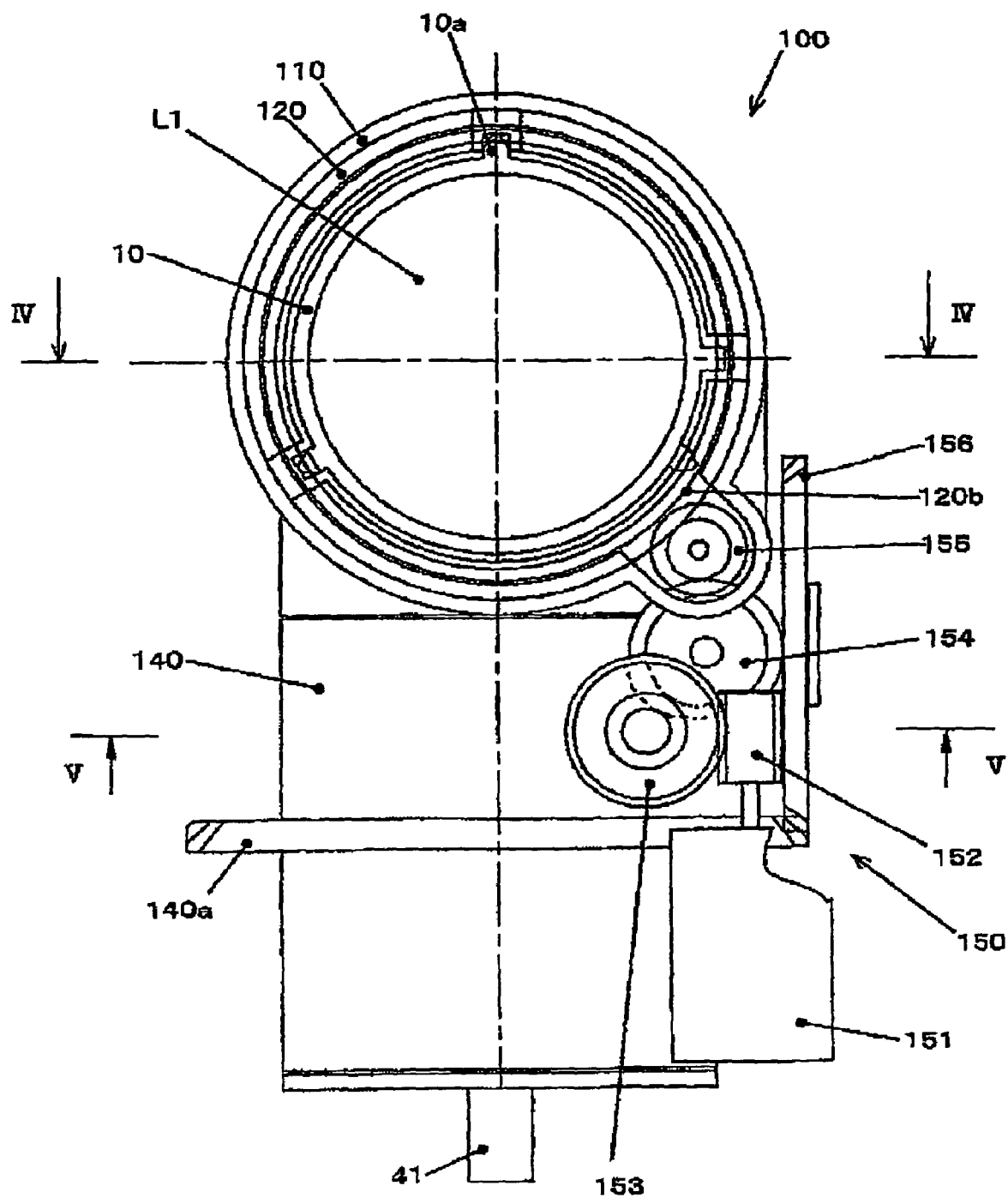
FIG. 2 is a sectional view taken through II-II in FIG. 1.
Figure 3:
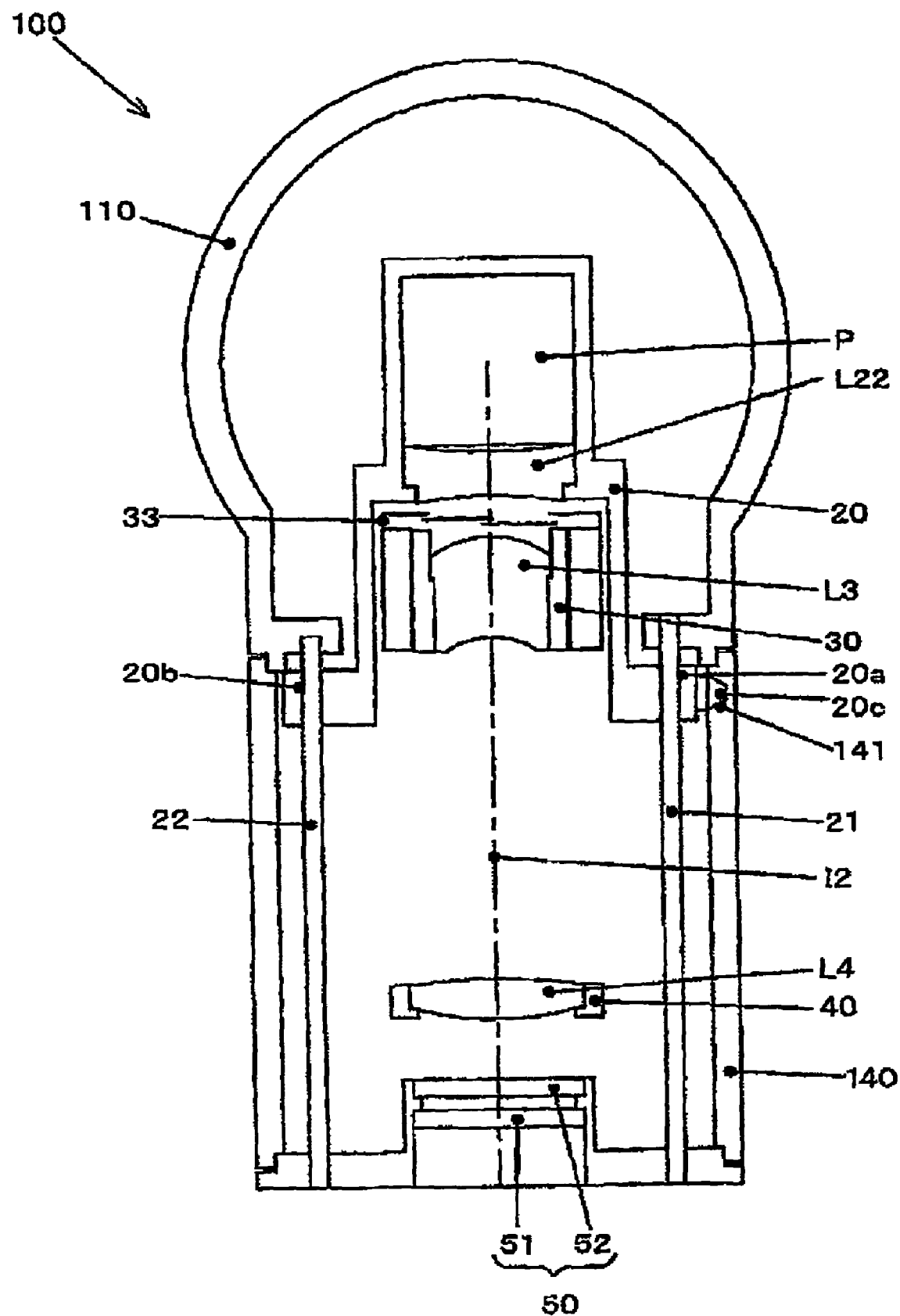
FIG. 3 is a sectional view taken through III-III in FIG. 1.
Figure 4:
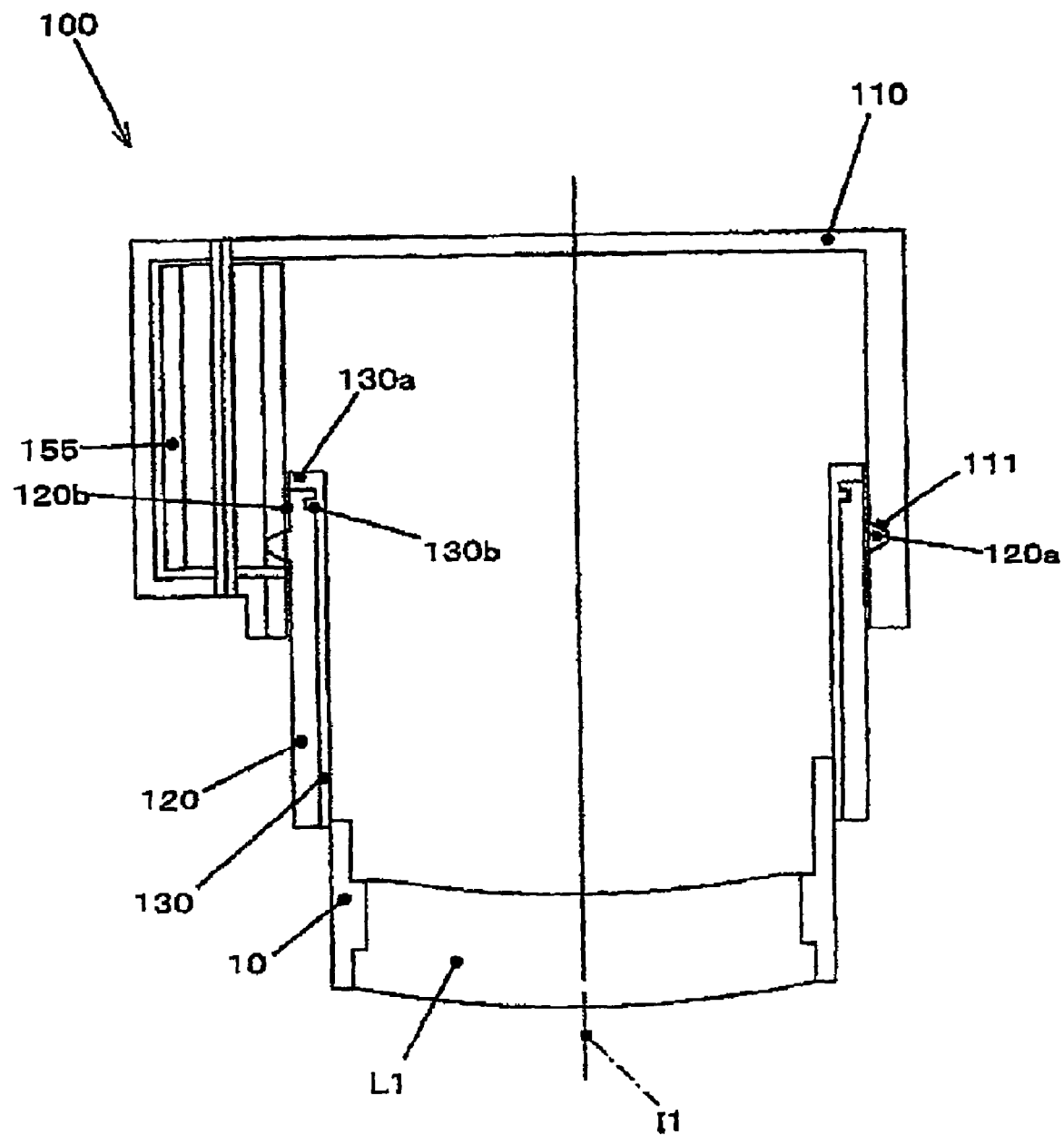
FIG. 4 is a sectional view taken through IV-IV in FIG. 2.
Figure 5:
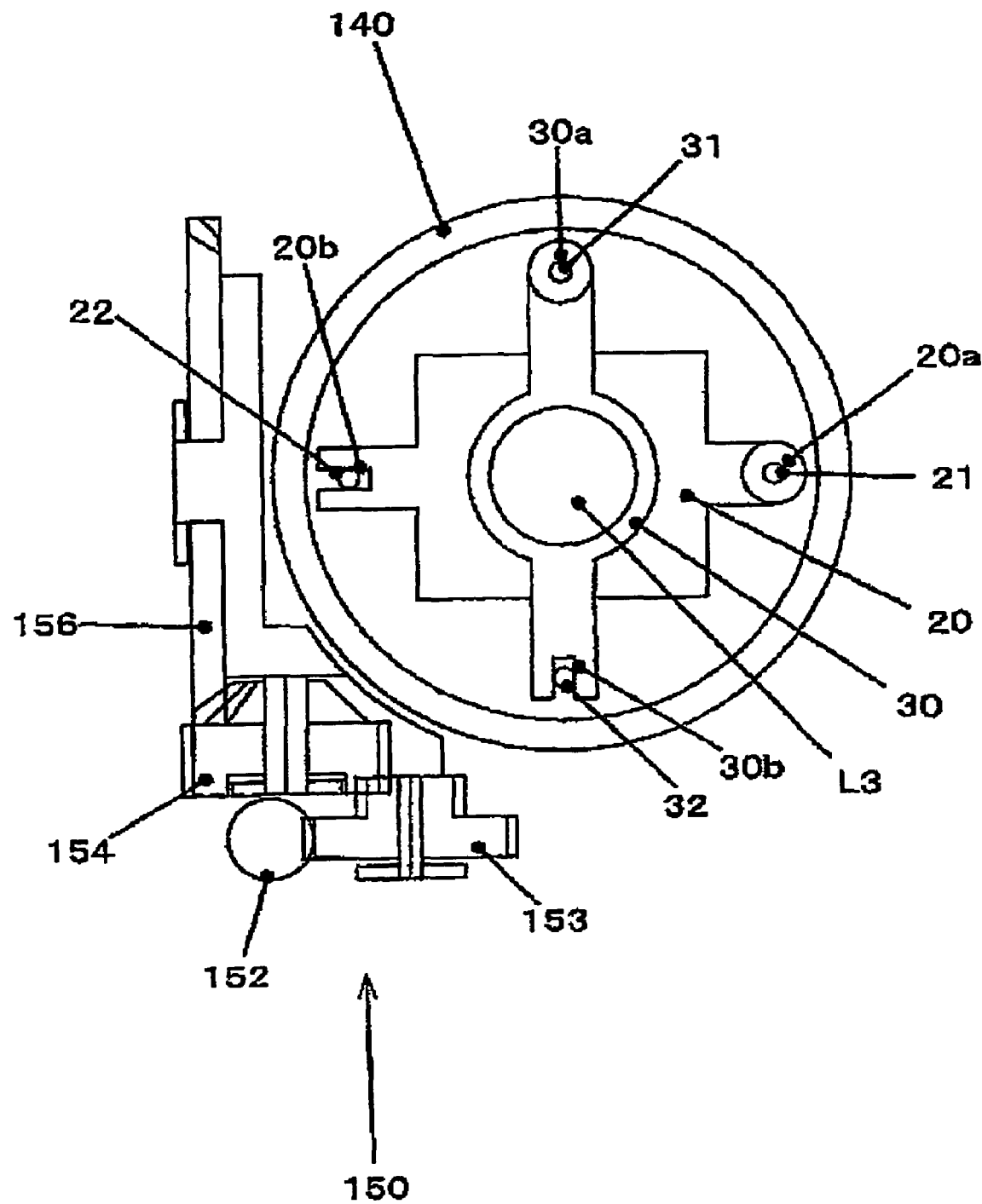
FIG. 5 is a sectional view taken through V-V in FIG. 2.
Figure 13:
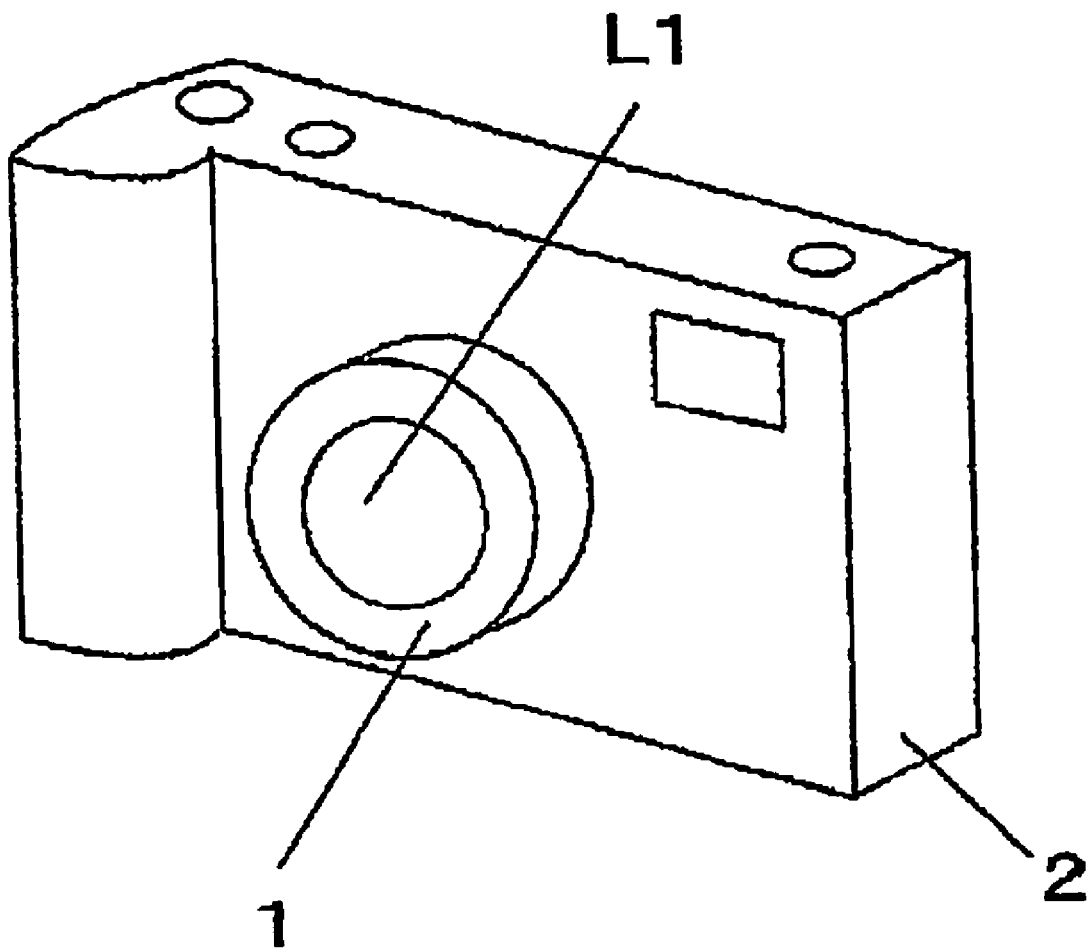
FIG. 13 is a perspective of a camera mounted with the lens barrel achieved in the embodiment.

The following is a detailed explanation of the lens barrel achieved in the embodiment of the present invention, given in reference to drawings. FIG. 1 is a sectional view of a lens barrel 1 achieved in the embodiment in the photographing state, taken at the telephoto end at which the focal length is at its greatest. FIG. 2 is a sectional view taken along II-II in FIG. 1 and FIG. 3 is a sectional view taken along III-III in FIG. 1. FIG. 4 is a sectional view taken along IV-IV in FIG. 2 and FIG. 5 is a sectional view taken along V-V in FIG. 2. FIG. 13 is an external view of a digital still camera mounted with the lens barrel 1 achieved in the embodiment.

The lens barrel 1 houses a photographic optical system that includes a plurality of optical elements such as lenses and prisms inside a barrel body 100. The photographic optical system includes a first lens group L1, a second lens group L2, a third lens group L3, a fourth lens group L4 and an imaging unit 50 disposed in this order from the objective side (subject side). The barrel body 100 includes a fixed cylinder 110, a first cam cylinder 120, a linear guide cylinder 130, a second cam cylinder 140 and a drive unit 150. The term "lens group" is used in this context to refer to a group of optical elements such as lenses and prisms fixed at a common lens chamber to move as one, i.e., an optical element group. However, the term may be used to refer to a single lens as well as a group including a plurality of optical elements.

The first lens group L1, which is an objective lens group in the photographic optical system, is used as a zooming lens group that alters the focal length of the photographic optical system as it moves along an optical axis I1. The first lens group L1 includes a first lens group chamber 10. The first lens group chamber 10 is a cylindrical member housing the first lens group L1 and is displaceably supported by a first cam cylinder 120 to be detailed later so as to move freely along the optical axis I1. Cam follower pins 10a disposed at the outer circumferential surface of the first lens group chamber 10 are inserted in cam grooves 121 at the first cam cylinder 120.

The second lens group L2 includes a prism P, lenses L21 and L22 and a second lens group chamber 20. The prism P is a bending portion that changes the direction of the optical axis I1 on the entry side so that the exit-side optical axis I2 extends at an angle of, for instance, 90° relative to the entry-side optical axis I1. The lenses L21 and L22 are respectively disposed on the entry side and the exit side of the prism P. The second lens group chamber 20, which holds steady the prism P and the lenses L21 and L22 housed therein, is displaceably supported at the barrel body 100 so as to move freely along the optical axis I2.

Guide shafts 21 and 22 are rod-shaped members extending parallel to the optical axis I2, which linearly guide the second lens group chamber 20 along the optical axis I2. As shown in FIG. 3, the guide shafts 21 and 22 are fixed to the fixed cylinder 110. The guide shafts 21 and 22 are disposed so as to hold the third lens group L3, the fourth lens group L4 and the like between them from a direction perpendicular to the optical axes I1 and I2.

In addition, as shown in FIG. 5, the guide shaft 21 is inserted at an opening 20a formed in the second lens group chamber 20. The inner diameter of the opening 20a is substantially equal to the outer diameter of the guide shaft 21. The guide shaft 22 is inserted at a groove portion 20b formed at the second lens group chamber 20. The groove portion 20b, formed as an elongated hole ranging along the radial direction of the lens L22, prevents the second lens group chamber 20 from rotating around the guide shaft 21. In addition, the second lens group chamber 20 includes a cam follower pin 20c, which is inserted at a cam groove 141 at the second cam cylinder 140, as shown in FIG. 3.

The third lens group L3 is disposed on the optical axis I2 on the exit side of the second lens group L2. The third lens group L3 is a zooming lens group that works together with the first lens group L1 as it moves along the optical axis I2 to alter the focal length of the photographic optical system. The third lens group L3 includes a third lens group chamber 30. The third lens group chamber 30, which houses and holds fast the third lens group L3 is displaceably supported at the barrel body 100 so as to move freely along the optical axis L2.

Guide shafts 31 and 32 are rod-shaped members extending parallel to the optical axis I2, which linearly guide the third lens group chamber 30 along the optical axis I2. As shown in FIG. 1, the guide shafts 31 and 32 are fixed to the fixed cylinder 110. The guide shafts 31 and 32 are disposed so as to hold the third lens group L3, the fourth lens group L4 and the like along the direction in which the optical axis I1 extends. The guide shaft 31 is disposed on the image side along the optical axis I1, whereas the guide shaft 32 is disposed on the objective side along the optical axis I2.

As shown in FIG. 5, the guide shaft 31 is inserted at an opening 30a formed in the third guide group chamber 30. The inner diameter of the opening 30a is substantially equal to the outer diameter of the guide shaft 31. The guide shaft 32 is inserted at a groove portion 30b formed at the third lens group chamber 30. The groove portion 30b, formed as an elongated hole ranging along the radial direction of the third lens group L3 prevents the third lens group chamber 30 from rotating around the guide shaft 31. The third lens group chamber 30 includes a cam follower pin 30c, which is inserted at a cam groove 142 at the second cam cylinder 140, as shown in FIG. 1. Furthermore, a shutter unit 33 is disposed on the entry side of the third lens group L3.

The fourth lens group L4 is disposed on the optical axis I2 on the exit side of the third lens group L3. As it moves along the optical axis I2, the fourth lens group L4 functions as a focusing lens group that alters the subject distance for the photographic optical system. The fourth lens group L4 includes a fourth lens group chamber 40, a focusing motor 41 and a screw 42.

The fourth lens group chamber 40, which holds fast the fourth lens group L4 housed therein, is displaceably supported at the barrel body 100 so as to move freely along the optical axis I2. As shown in FIG. 1, an opening 40a at which the guide shaft 31 shared with the third lens group chamber 30 is inserted is formed at the fourth lens group chamber 40. The parallel displacement of the fourth lens group chamber 40 along the optical axis I2 is guided as the inner circumferential surface of the opening 40a slides against the outer circumferential surface of the guide shaft 31.

The focusing motor 41 is an actuator that drives the fourth lens group chamber 40. The focusing motor 41 is disposed so as to project further out beyond the end of the barrel body 100 on the image side with its rotational axis set parallel to the optical axis I2. The screw 42 is fixed to the output shaft of the focusing motor 41. The screw 42 includes a male threaded portion that interlocks with a female threaded portion 40b formed at the fourth lens group chamber 40 and as the screw 42 rotates, the fourth lens group chamber 40 is driven along the optical axis I2.

The imaging unit 50, disposed on the exit side of the fourth lens group L4, includes an image sensor 51 and an optical low pass filter (LPF) 52. The image sensor 51, which includes a photoelectric conversion element such as a CCD or a CMOS, converts a subject image formed on the imaging surface thereof to an electrical signal and outputs the electrical signal resulting from the conversion. The optical LPF 52 disposed so as to cover the imaging surface of the imaging element 51 prevents the occurrence of moire and the like.

The fixed cylinder 110 at the barrel body 100 is fixed to the camera body 2 (see FIG. 13). The fixed cylinder 110, assuming a substantially cylindrical shape coaxial with the optical axis I1, houses the first cam cylinder 120 therein. The end surface of the fixed cylinder 110 on the image side along the optical axis I1 is closed off, with an opening to which the second cam cylinder 140 is connected formed at the side wall thereof.

Figure 6:
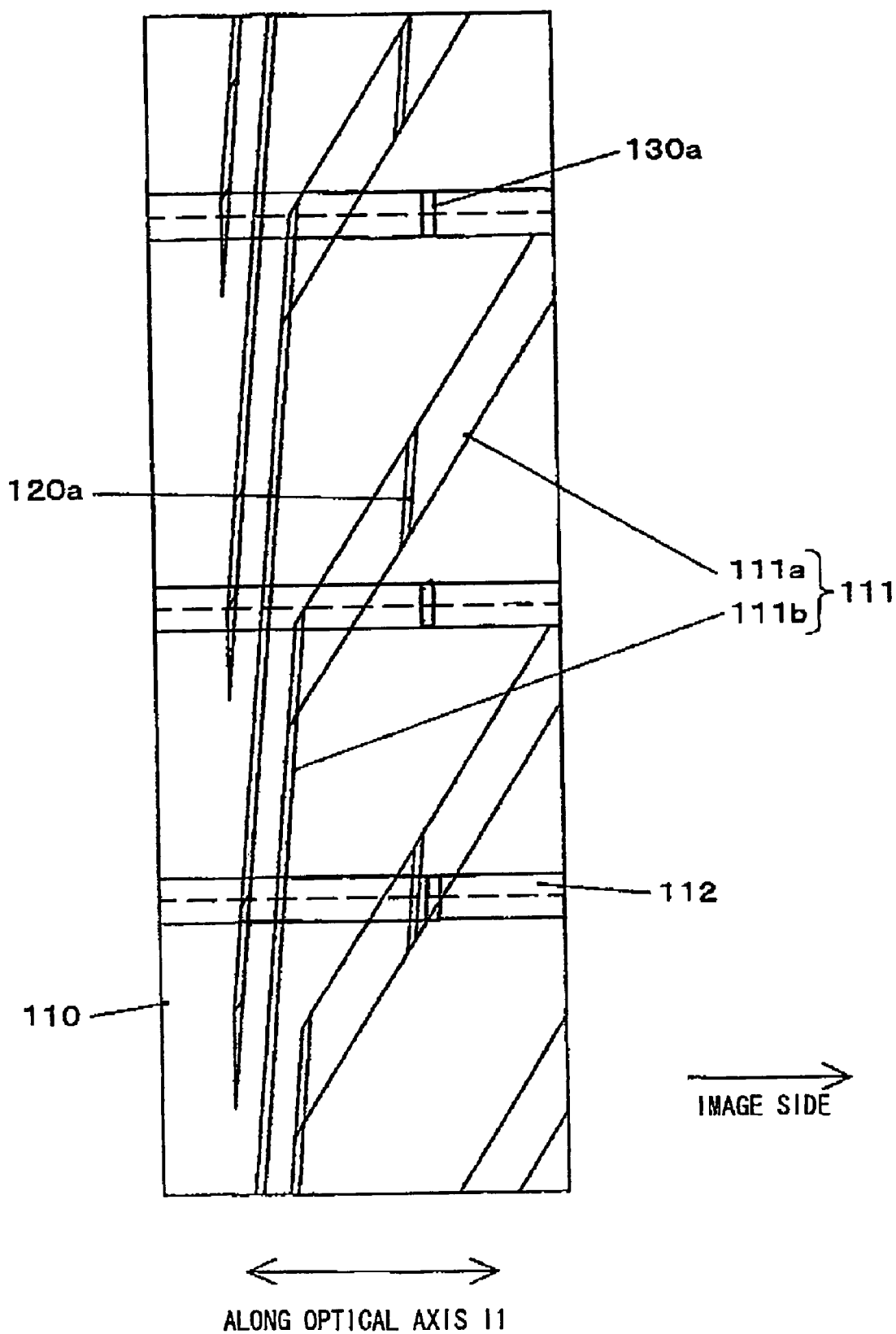
FIG. 6 is a development plan of the inner circumferential surface of a fixed cylinder at the lens barrel shown in FIG. 1.

FIG. 6 is a development plan of the inner circumferential surface of the fixed cylinder 110. Female threaded portions 111 and linear guide grooves 112 are formed at the fixed cylinder 110. The female threaded portions 111 interlock with male threaded portion 120a at the first cam cylinder 120 and the first cam cylinder 120 is thus driven along the optical axis I1 as the first cam cylinder 120 rotates around the optical axis I1 relative to the fixed cylinder 110.

Figure 10:
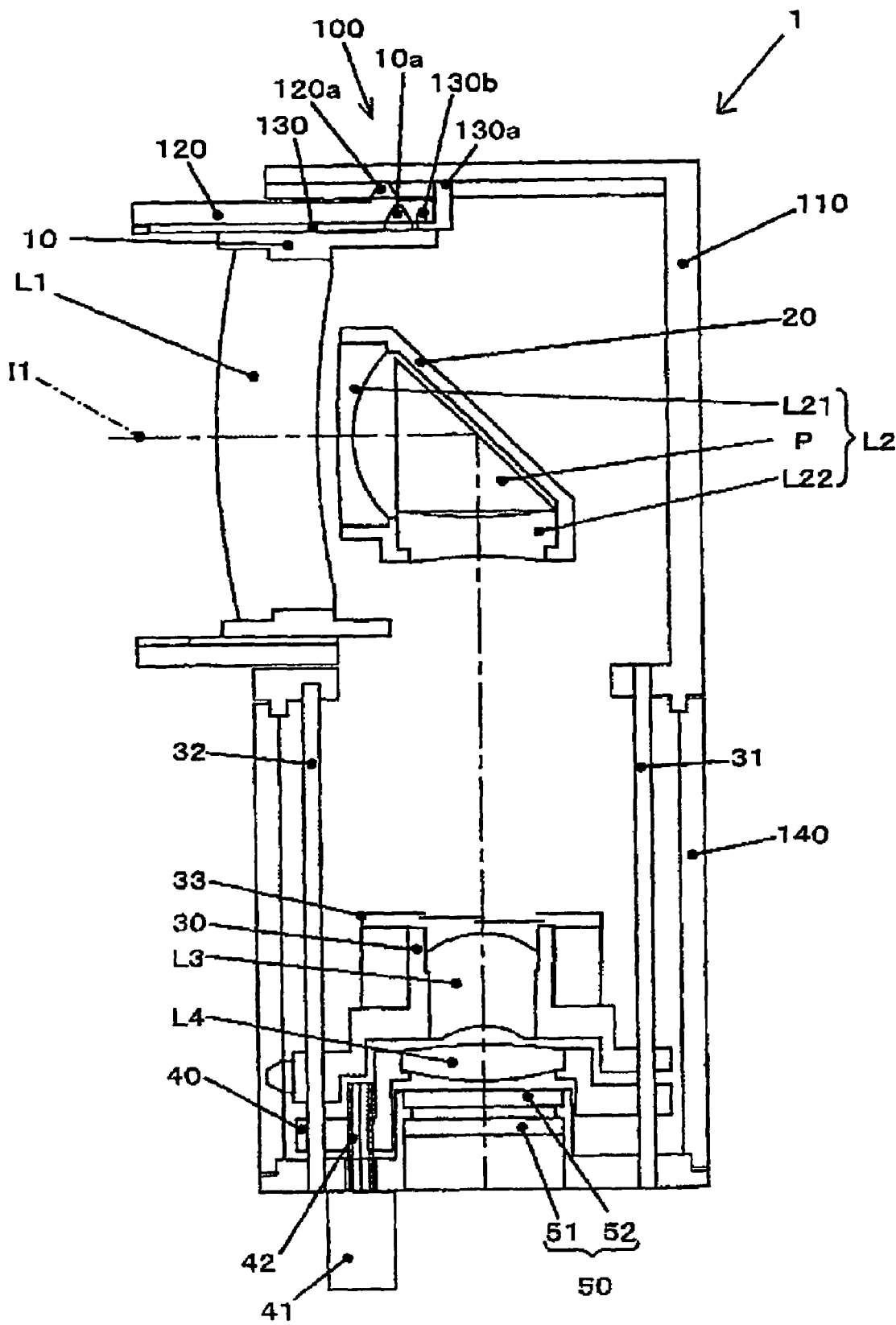
FIG. 10 is a sectional view of the lens barrel in FIG. 1 in a photographing state, taken at the wide angle end.

The female threaded portions 111 are each formed as a combination screw which includes an area 111a used over the range between the storage state of the lens barrel 1 and the wide-angle end in the photographing state of the lens barrel as shown in FIG. 10, and an area 111b used over the range between the wide-angle end and the telephoto end shown in FIG. 1 in the photographing state. A greater lead angle is assumed at the area 111a than at the area 111b so as to achieve a greater drive quantity relative to a given rotational angle by which the first cam cylinder 120 rotates. The lens barrel 1 assumes the storage state when, for instance, the power to the camera is off and the lens barrel 1 is driven into the completely retracted state. When the lens barrel 1 is in the storage state, a photographing operation that requires the use of the lens barrel 1 is not allowed. When the lens barrel 1 is in the photographing state, the power to the camera is on and the photographing operation is allowed with the lens barrel 1 having been driven further out relative to the storage state.

In the linear guide grooves 112 extending along the optical axis I1, keys 130a formed at the outer circumferential surface of the linear guide cylinder 130 are inserted. The keys 130a inserted in the linear guide grooves 112 are linearly guided along the optical axis I1.

The first cam cylinder 120 is inserted in the fixed cylinder 110 with the first lens group chamber 10 housed therein. As the first cam cylinder 120 rotates around the optical axis I1 relative to the fixed cylinder 110, it becomes displaced along the optical axis I1 relative to the fixed cylinder 110 and causes the first lens group chamber 10 to become displaced along the optical axis I1 relative to the first cam cylinder 120.

Figure 7:
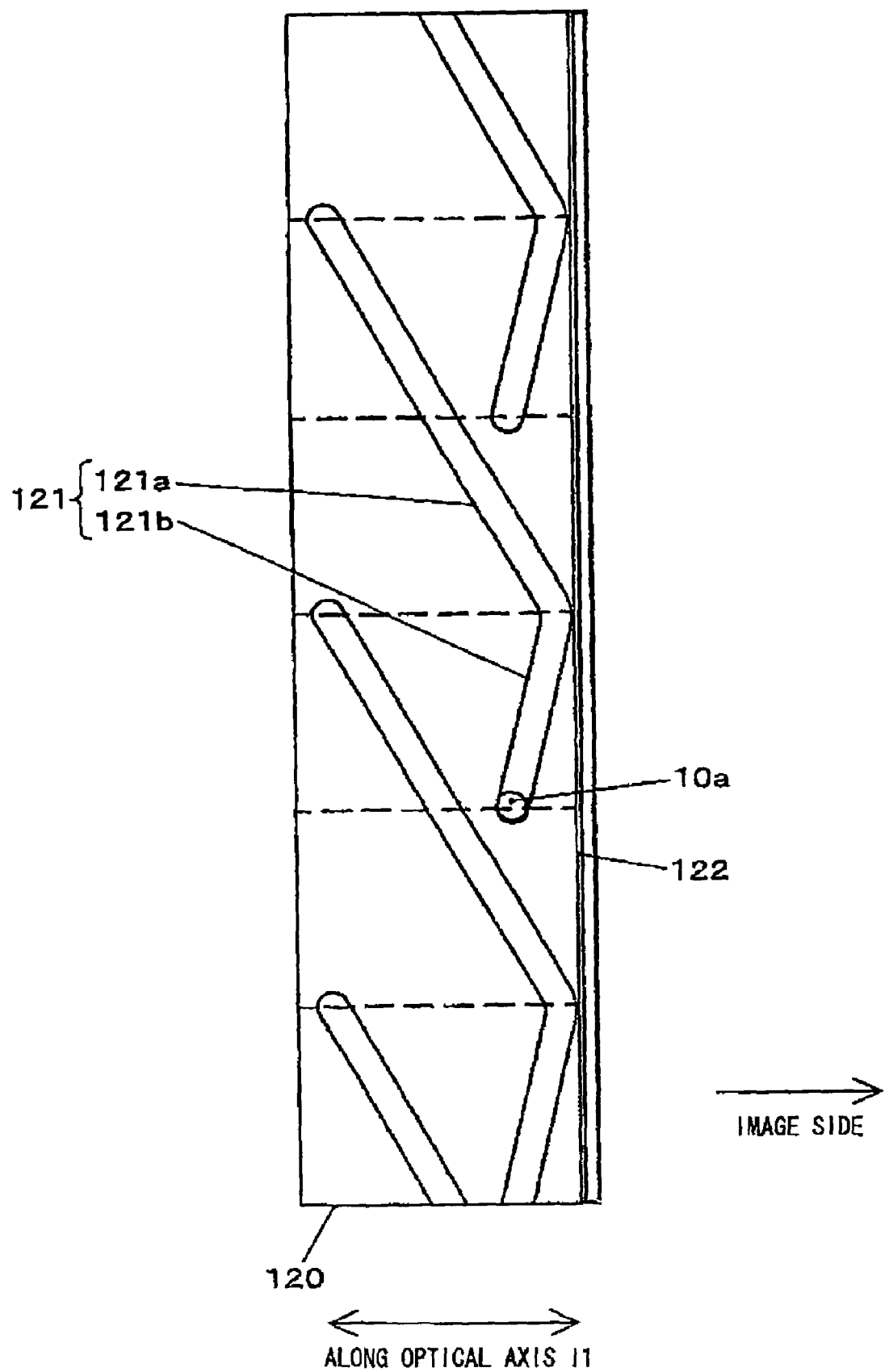
FIG. 7 is a development plan of the inner circumferential surface of a first cam cylinder at the lens barrel shown in FIG. 1.

FIG. 7 is a development plan of the inner circumferential surface of the first cam cylinder 120. The cam grooves 121 at which the cam follower pins 10a at the first lens group chamber 10 are inserted and a circumferential groove 122 at which a circumferential key 130b at the linear guide cylinder 130 is inserted are formed at the first cam cylinder 120.

The cam grooves 121 each include an area 121a, used over the range between the telephoto end and the wide-angle end in the photographing state and an area 121b, used over the range between the wide-angle end and the storage state. The cam grooves incline along different directions over the area 121a and the area 121b. The circumferential groove 122 is a groove formed so as to extend along the circumferential direction at the image-side end along the optical axis I1. The linear guide cylinder 130 is rotatably supported at the circumferential groove 122 so as to rotate around the optical axis I1 relative to the first cam cylinder 120 and the relative displacement of the linear guide cylinder along the optical axis I1 is restricted via the circumferential groove 122.

As shown in FIG. 1, the male threaded portion 120a formed at the first cam cylinder 120 project out beyond the outer circumferential surface of the first cam cylinder. The male threaded portion 120a interlock with the female threaded portions 111 at the fixed cylinder 110. In addition, a gear portion 120b is formed to range along the circumferential direction at the outer circumferential surface of the first cam cylinder 120 at the image-side end thereof along the optical axis I1 (see FIG. 2). The gear portion 120b interlocks with a first cam cylinder drive gear 155.

The linear guide cylinder 130 assuming a substantially cylindrical shape is inserted in the first cam cylinder 120, with the first lens group chamber 10 inserted therein. The linear guide cylinder 130 linearly guides the first lens group chamber 10 along the optical axis I1 relative to the fixed cylinder 110. At the outer circumferential surface of the linear guide cylinder 130, the linear keys 130a inserted in the linear guide grooves 112 at the fixed cylinder 110 and the circumferential key 130b inserted at the circumferential groove 122 at the first cam cylinder are formed.

Figure 8:
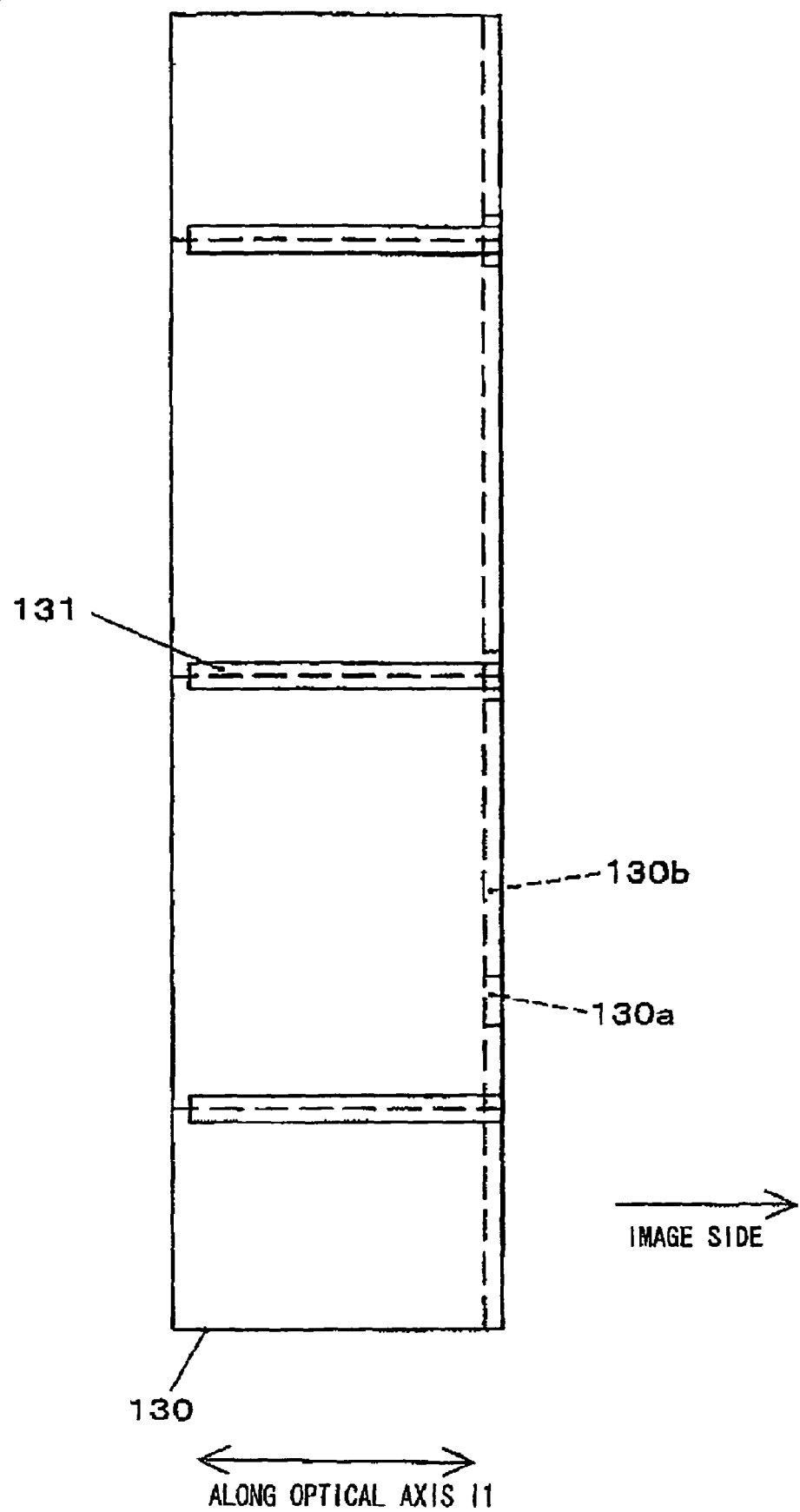
FIG. 8 is a development plan of the inner circumferential surface of a linear guide cylinder at the lens barrel shown in FIG. 1.

FIG. 8 is a development plan of the inner circumferential surface of the linear guide cylinder 130. Openings assuming the form of elongated holes ranging along the optical axis I1 are formed as linear guide grooves 131 at the linear guide cylinder 130. Middle portions 10aa of the cam follower pins 10a at the first lens group chamber 10, which are inserted in the cam grooves 121 at the first cam cylinder 120, are inserted in the linear guide grooves 131.

The second cam cylinder 140 is a cylindrical member coaxial with the optical axis I2, and houses the third lens group L3 and the fourth lens group L4 therein. As the second cam cylinder 140 rotates around the optical axis I2 relative to the imaging unit 50 and the fixed cylinder 110, the second lens group chamber 20 and the third lens group chamber 30 are both displaced along the optical axis I2 relative to the imaging unit 50 and the fixed cylinder 110.

Figure 9:
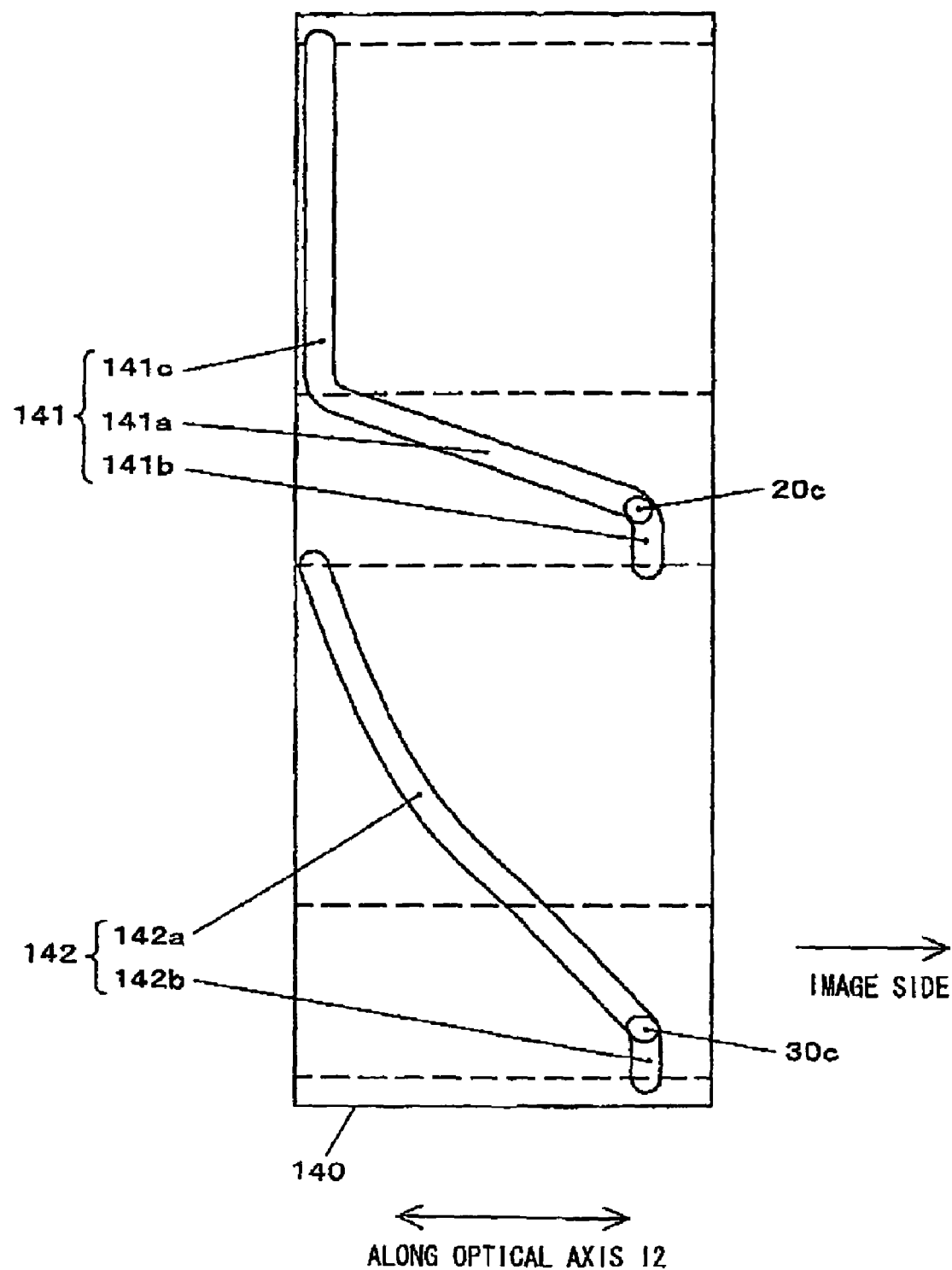
FIG. 9 is a development plan of the inner circumferential surface of a second cam cylinder at the lens barrel shown in FIG. 1.

FIG. 9 is a development plan of the inner circumferential surface of the second cam cylinder 140. The cam groove 141, at which the cam follower pin 20c at the second lens group chamber 20 is inserted and the cam groove 142, at which the cam follower pin 30c at the third lens group chamber 30 is inserted, are formed at the second cam cylinder 140. The cam groove 141 includes an area 141a, used for the displacement of the second lens group chamber 20, an area 141b, used to hold the second lens group chamber 20 at the position assumed in the storage state (hereafter referred to as the "storage position") and an area 141c, used to hold the second lens group chamber 20 at the position assumed in the photographing state (hereafter referred to as the "photographing position").

The area 141a is formed by tilting the cam groove 141 so as to drive the second lens group chamber 20 along the optical axis I2 as the second cam cylinder 140 rotates. Over the area 141a, the second lens group chamber 20 is caused to move between the storage position and the photographing position. The areas 141b and 141c are formed respectively continuous to the storage position-side end and the photographing position-side end of the area 141a and range along the circumference of the second cam cylinder 140.

At the area 141b, the displacement of the second lens group chamber 20 along the optical axis I2 is temporarily halted so as to prevent the second lens group chamber 20 from interfering with the members such as the first lens group chamber 10 and the first cam cylinder 120 that move by interlocking with the first lens group L1 as the lens barrel 1 shifts from the storage state to the photographing state. At the area 141c, the second lens group L2 is held at a specific photographing position while the first lens group L1 and the third lens group L3 are driven between the wide-angle end and the telephoto end.

The cam groove 142 includes an area 142a, used for displacement of the third lens group chamber 30 and an area 142b, used to hold the third lens group chamber 30 at the storage position. The area 142a is formed by tilting the cam groove 142 so as to drive the third lens group chamber 30 along the optical axis I2 as the second cam cylinder 140 rotates. Over the area 142a, the third lens group chamber 30 is caused to move between the storage position and the photographing position and between the telephoto end and the wide-angle end in the photographing state.

The area 142b, formed continuous with the storage position-side end of the area 142a, ranges along the circumference of the second cam cylinder 140. Via the area 142b, displacement of the third lens group chamber 30 along the optical axis I2 is restricted so as to prevent collision of the third lens group chamber 30 and the second lens group chamber 20 when the cam follower pin 20c at the second lens group chamber 20 assumes a position within the area 141b in the cam groove 141 and the displacement of the second lens group chamber 20 along the optical axis I2 is thus restricted.

As shown in FIG. 2, a gear portion 140a ranging along the circumferential direction as shown in FIG. 2 is formed at the outer circumferential surface of the second cam cylinder 140. The gear portion 140a includes a bevel gear driven by a second cam cylinder drive gear 156.

The drive unit 150 rotationally drives the first can cylinder 120 and the second cam cylinder 140 respectively around the optical axis I1 and the optical axis I2. The drive unit 150 includes a motor 151, a screw 152, a first speed reduction gear 153, a second speed reduction gear 154, a first cam cylinder drive gear 155 and the second cam cylinder drive gear 156. As shown in FIG. 2, the motor 151 is disposed so as to face opposite the outer circumferential surface of the second cam cylinder 140, with the rotational axis thereof set parallel to the optical axis I2. The screw 152 is fixed to the output shaft of the motor 151.

The first speed reduction gear 153 reduces the rotational speed of the screw 152 and transmits the rotation thus slowed to the second speed reduction gear 154. The rotational axis of the first speed reduction gear 153 is set parallel to the optical axis I1. The first speed reduction gear 153 is constituted with a pair of spur gears with different numbers of teeth and different pitch circle diameters (PCDs), set side by side along the rotational axis and formed as an integrated unit. The gear with the greater number of gear teeth is driven by the screw 152, whereas the gear with the smaller number of gear teeth drives the second speed reduction gear 154.

The second speed reduction gear 154 reduces the rotational speed of the first speed reduction gear 153 and drives the first cam cylinder drive gear 155 and the second cam cylinder drive gear 156 individually. The rotational axis of the second speed reduction gear 154 is set parallel to the optical axis I1. The second speed reduction gear 154 is constituted with a spur gear and a bevel gear set side by side along the rotational axis and formed as an integrated unit. The spur gear, driven by the first speed reduction gear 153, in turn, is used to drive the first cam cylinder drive gear 155, whereas the bevel gear is used to drive the second cam cylinder drive gear 156.

The first cam cylinder drive gear 155 reduces the rotational speed of the second speed reduction gear 154 and transmits the rotation thus slowed to the gear portion 120b at the first cam cylinder 120, thereby rotationally driving the second cam cylinder 120 around the optical axis I1. The first cam cylinder drive gear 155 is constituted with a spur gear, the rotational axis thereof set in parallel to the optical axis I1. In order to sustain the interlocked state even as the first cam cylinder 120 moves along the optical axis I1, the first cam cylinder drive gear 155 is designed so that its length measured along the rotational axis is greater than the length of the gear portion 120b at the first cam cylinder 120.

The second cam cylinder drive gear 156 reduces the speed of rotation of the second speed reduction gear 154 and drives the gear portion 140a at the second cam cylinder 140. The second cam cylinder drive gear 156 is a bevel gear with the rotational axis thereof set along the direction perpendicular to both the optical axis I1 and the optical axis I2.

FIG. 10 is a sectional view of the lens barrel 1 in the photographing state taken at the wide-angle end at which the focal length is at its smallest. The state assumed at the wide-angle end differs from that assumed at the telephoto end shown in FIG. 1 in that the first lens group L1 has moved to the image side along the optical axis I1 to assume a position next to the second lens group L2. In addition, the third lens group L3 has moved toward the image side along the optical axis I2 to assume a position next to the fourth lens group L4. The first lens group L1 and the third lens group L3 are caused to move between the wide-angle end and the telephoto end in the photographing state by engaging the drive unit 150 to rotationally drive the first cam cylinder 120 and the second cam cylinder 140 in conjunction with each other and thus by driving the first lens group chamber 10 and the third lens group chamber 30 through the corresponding cam grooves 121 and 142.

Figure 11:
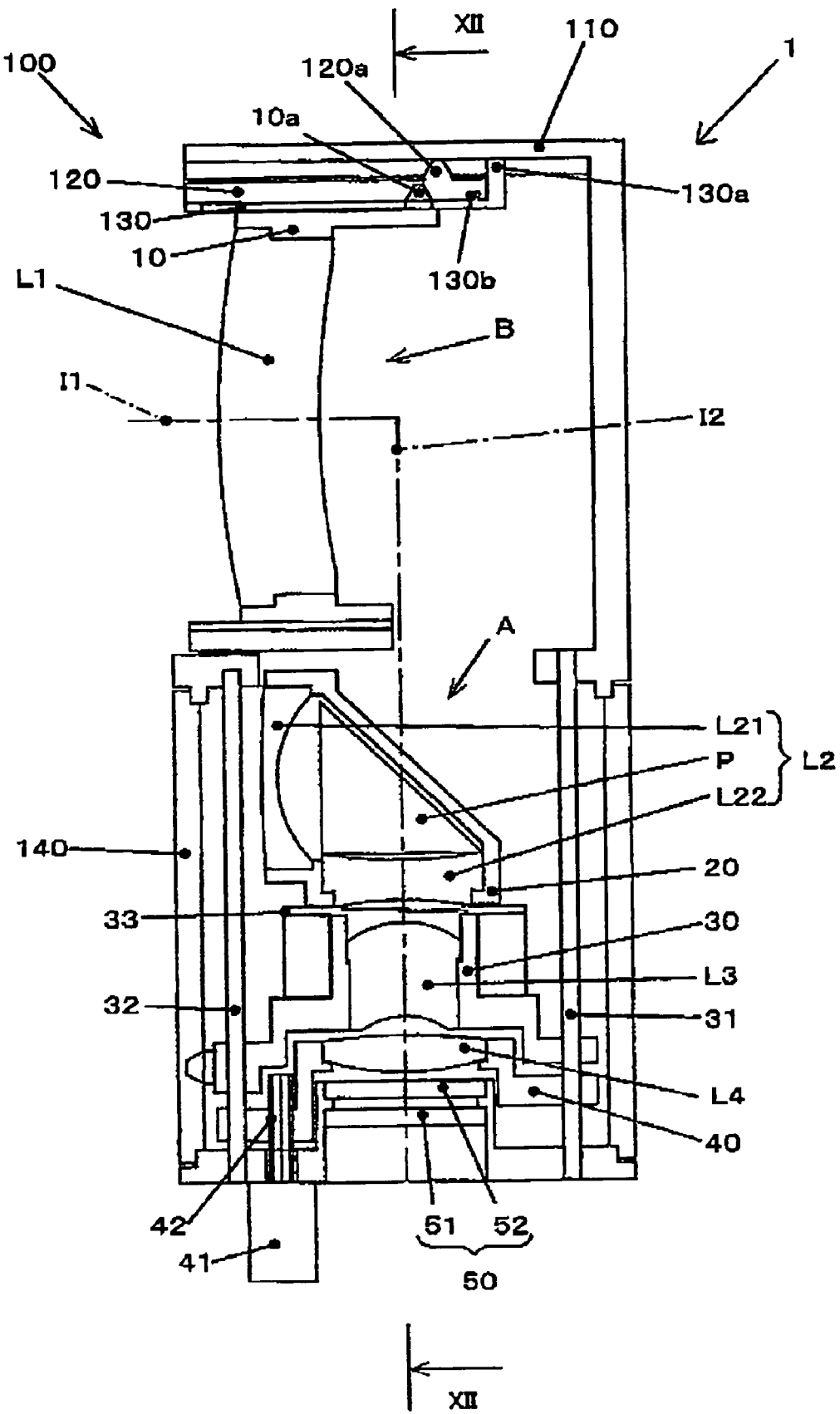
FIG. 11 is a sectional view of the lens barrel in FIG. 1 in a storage state.
Figure 12:
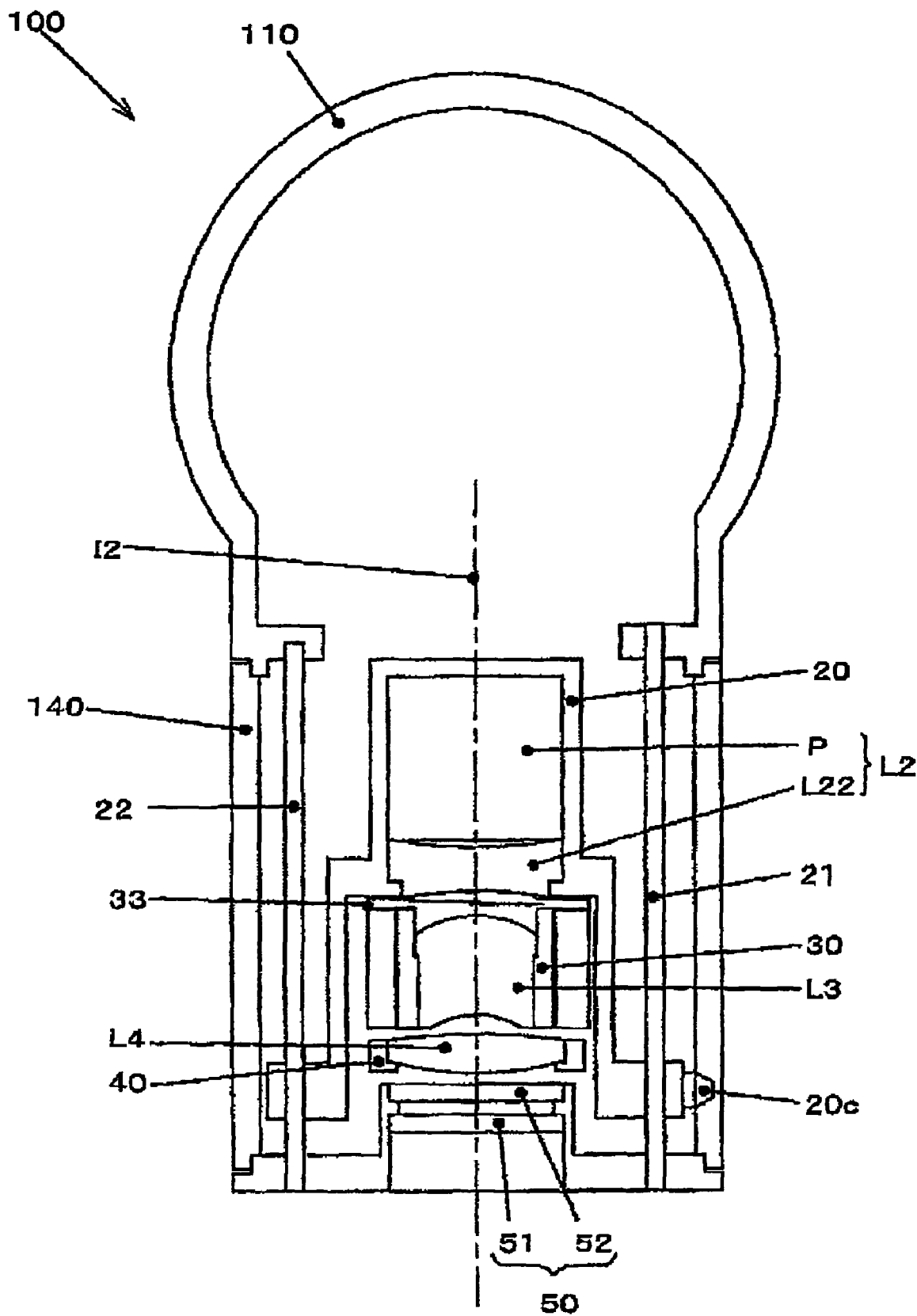
FIG. 12 is a sectional view taken through XII-XII in FIG. 11.

FIG. 11 is a sectional view of the lens barrel 1 achieved in the embodiment in the storage state. FIG. 12 is a sectional view of the lens barrel 1 in FIG. 11, taken along XII-XII.

Figure 14:
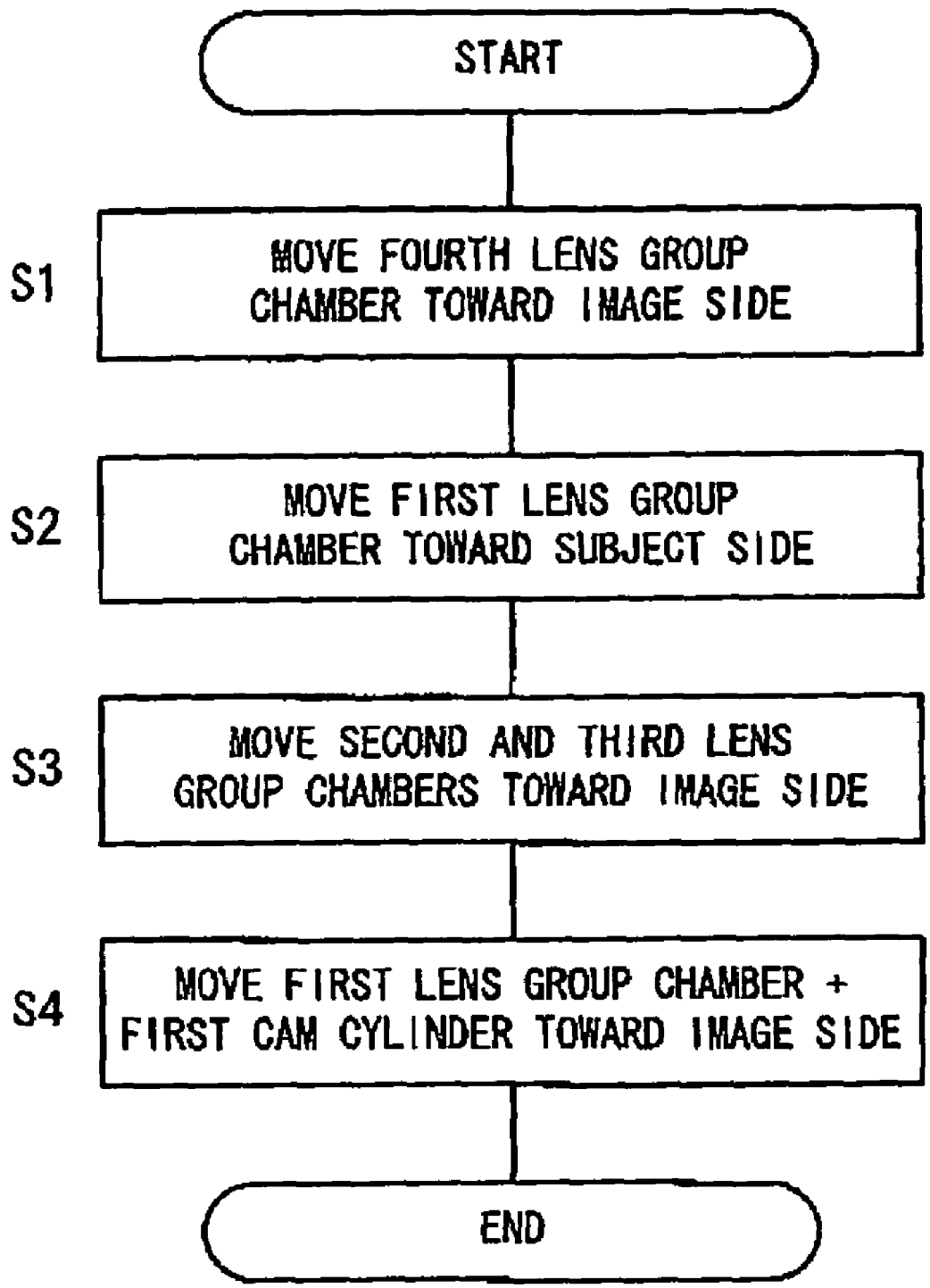
FIG. 14 presents a flowchart of operations executed by the various units as the lens barrel shifts from the photographing state to the storage state.

The following is an explanation on the flow of operations executed at the individual units constituting the lens barrel 1 as it shifts from the photographing state assumed at the wide-angle end as shown in FIG. 10 to the storage state shown in FIG. 11, given in reference to the flowchart presented in FIG. 14. The sequence of operations shown in FIG. 14 is started as, for instance, a power switch (not shown) at the camera is turned off.

(1) The fourth lens group chamber 40, driven by the focusing motor 41, moves toward the image side along the optical axis I2 (S1).

(2) The first cam cylinder 120 and the second cam cylinder 140 are caused to start rotating by the drive unit 150. At this time, the first lens group chamber 10 is briefly driven toward the subject along the optical axis I1 via the cam grooves 121 at the first cam cylinder 120 (S2).

(3) As the first cam cylinder 120 and the second cam cylinder 140 continue to rotate, the second lens group chamber 20 and the third lens group chamber 30 are both caused to move toward the image side along the optical axis I2 respectively through the cam grooves 141 and 142 at the second cam cylinder 140 (S3). As a result, the third lens group chamber 30 assumes a position next to the fourth lens group chamber 40 and the second lens group chamber 20 becomes housed inside a space A formed by the displacement of the third lens group chamber 30. At this time, the second lens group chamber 20 assumes a retreated state away from the projection plane over which the first lens group chamber 10, the first cam cylinder 120 and the linear guide cylinder 130 are projected, viewed from the direction of the optical axis I1.

(4) As the first cam cylinder 120 and the second cam cylinder 140 continue to rotate, the first lens group chamber 10 is caused to move to the image side along the optical axis I1 relative to the first cam cylinder 120 via the cam grooves 121 at the first cam cylinder 120 and the first cam cylinder 120 is caused to move toward the image side along the optical axis I1 via the female threaded portions 111 at the fixed cylinder 110 (S4). The first lens group chamber 10 keeps moving to the position at which part of the first lens group L1 becomes housed inside a space B on the inner diameter side of the fixed cylinder 110 formed as the second lens group chamber 20 retreats along the optical axis I2. The drive unit 150 then stops the drive of the first cam cylinder 120 and the second cam cylinder 140.

It is to be noted that when the lens barrel 1 shifts from the storage state to the wide-angle end in the photographing state, the individual units operate in the order and along directions opposite from those of the operations described above.

The embodiment described above can achieve the following advantageous effects.

(1). When the lens barrel 1 is in the storage state, part of the first lens group L1 is housed within the space B formed as a result of the retreat of the second lens group L2 toward the image side along the optical axis I2, i.e., along the direction moving away from the optical axis I1. Thus, even when the photographic optical system is constituted with a bending optical system, the extent to which the first lens group L1 retracts, i.e., the extent to which the first lens group moves toward the image side along the optical axis I1, can be increased, which, in turn, allows the lens barrel 1 to be stored as a compact unit. Namely, since the lens barrel 1 in the storage state does not have any of the first lens group chamber 10, the first cam cylinder 20 and the linear guide cylinder 130 projecting out, the entire lens barrel can be stored within the fixed cylinder 110.

(2) When the lens barrel 1 is in the storage state, the second lens group L2 is housed within the space A formed as a result of the displacement of the third lens group L3 and the fourth lens group L4 toward the image side along the optical axis I2. Consequently, a retreat space for the second lens group L2 can be secured without having to increase the size of the lens body 100 and the lens barrel 1 can be stored as an even more compact unit.

(3) The first lens group chamber 10, the first cam cylinder 120 and the linear guide cylinder 130, which move by interlocking with the first lens group L1, are temporarily driven out toward the objective side along the optical axis I1 when the second lens group L2 is displaced. This means that even if the dimensions of the end portions of the individual members on the image side are significant, interference with the second lens group chamber 20 and the like can be avoided. This, in turn, assures a greater light shielding effect with greater end portions so as to prevent any leakage of light into the barrel body 100.

Examples of Variations

The present invention is not limited to the embodiment described above and allows for numerous variations and modifications which are equally within the scope of the present invention.

(1) In the embodiment described above, the lens barrel 1 is mounted at a digital still camera. However, the present invention is not limited to this example and it may be adopted in a lens barrel at a silver halide film camera or a movie camera or in other types of optical devices including observation devices and projector devices.

(2) In the embodiment described above, the second lens group L2, which includes the bending portion, retreats along the optical axis I2 through parallel displacement. However, the present invention is not limited to this example and the second lens group L2, which includes the bending portion, may retreat so as to move away from the optical axis I1 along a direction other than the direction extending along the optical axis I2. In addition, the second lens group L2 may retreat by rotating around a specific rotational axis instead of through parallel displacement.

(3) While part of the first lens group L1 is housed inside the space B formed as a result of the retreat of the second lens group L2 to the image side along the optical axis I2 in the embodiment described above, it will be obvious that the entire first lens group L1 may be housed within the space B as well. Namely, the present invention simply requires that at least part of the first lens group L1 can be housed within the space B.

(4) While the second lens group chamber 20 is housed within the space A formed as a result of the displacement of the third lens group chamber 30 in the embodiment described above, the present invention is not limited to this example and it simply requires that at least part of the second lens group chamber 20 can be housed inside the space A.

The disclosure of the following priority application is herein incorporated by reference:

Japanese Patent Application No. 2005-218821 filed Jul. 28, 2005

The invention claimed is:

1. A lens barrel, comprising:
a first optical element group that comprises an optical element disposed on a first optical axis;
a second optical element group that comprises an optical element disposed on a second optical axis extending along a direction different from a direction along which the first optical axis extends;
a bending portion disposed between the first optical element group and the second optical element group, that bends image light having passed through the first optical element;
a first cam cylinder that houses the first optical element group and moves the first optical element group along the first optical axis;
a second cam cylinder that moves the bending portion and the second optical element group along the second optical axis; and
a fixed cylinder with the first cam cylinder disposed therein, that is connected with the second cam cylinder, wherein:
when the lens barrel shifts from a photographing position at which photographing operation executed by using the lens barrel is allowed to a storage position at which the photographing operation is not allowed, (a) at least part of the first optical element group is housed inside a first space formed as the bending portion moves further away from the first optical axis and (b) at least part of the bending portion is housed inside a second space formed as the second optical element group moves further toward an image side relative to the photographing position; and
the first cam cylinder is housed inside the fixed cylinder at the storage position.

2. A lens barrel according to claim 1, wherein:
the first cam cylinder comprises a cam groove at which a cam follower pin disposed at the first optical element group is inserted; and
the cam groove includes an area, used over a range between a wide-angle end and a telephoto end assumed at the photographing position and an area, used over a range between the wide-angle end of the photographing position and the storage position, which incline along directions opposite from each other.

3. A camera comprising a lens barrel according to claim 1.

4. A lens barrel, comprising:
a first optical element group that comprises an optical element disposed on a first optical axis;
a second optical element group that comprises an optical element disposed on a second optical axis extending along a direction different from a direction along which the first optical axis extends;
a bending portion disposed between the first optical element group and the second optical element group, that bends image light having passed through the first optical element,
a motor;
a first drive mechanism configured to transmit drive force of the motor to the first optical element group so as to move the first optical element group to a first space formed as the bending portion moves further away from the first optical axis;
a second drive mechanism configured to transmit drive force of the motor to the bending portion so as to move the bending portion to a second space formed as the second optical element group moves further toward the image side relative to a photographing position; and
a third drive mechanism configured to transmit drive force of the motor to the second optical element group so as to move the second optical element group further toward an image side, wherein:
when the lens barrel shifts from the photographing position at which photographing operation executed by using the lens barrel is allowed to a storage position at which the photographing operation is not allowed, (a) at least part of the first optical element group is housed inside the first space, and (b) at least part of the bending portion is housed inside the second space.

5. A lens barrel according to claim 4, wherein:
the second drive mechanism and the third drive mechanism comprise a common cam cylinder used by both the second drive mechanism and the third drive mechanism.

\* \* \* \* \*